US010827725B2

(12) United States Patent
Sawada et al.

(10) Patent No.: US 10,827,725 B2
(45) Date of Patent: Nov. 10, 2020

(54) ANIMAL RESCUE SYSTEM AND ANIMAL RESCUE METHOD, AND SERVER USED FOR ANIMAL RESCUE SYSTEM AND ANIMAL RESCUE METHOD

(71) Applicant: TOYOTA JIDOSHA KABUSHIKI KAISHA, Toyota (JP)

(72) Inventors: Hiroki Sawada, Toyota (JP); Masato Tamaoki, Iwakura (JP); Eisuke Ando, Nagoya (JP); Masato Endo, Nagakute (JP); Kuniaki Hasegawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/188,635

(22) Filed: Nov. 13, 2018

(65) Prior Publication Data

US 2019/0141948 A1    May 16, 2019

(30) Foreign Application Priority Data

Nov. 13, 2017    (JP) .................................. 2017-218374

(51) Int. Cl.
*G08B 23/00* (2006.01)
*A01K 11/00* (2006.01)
(Continued)

(52) U.S. Cl.
CPC .............. *A01K 11/008* (2013.01); *G06K 7/10* (2013.01); *A01K 27/009* (2013.01); *G08B 21/0202* (2013.01)

(58) Field of Classification Search
CPC ...... A01K 11/008; A01K 27/009; G06K 7/10; G08B 21/0202
(Continued)

(56) References Cited

U.S. PATENT DOCUMENTS 9,471,059 B1    10/2016  Wilkins
9,481,367 B1 *  11/2016  Gordon ................. B60W 10/20
(Continued)

FOREIGN PATENT DOCUMENTS

CN    102754436 A    10/2012
CN    106796748 A    5/2017
(Continued)

OTHER PUBLICATIONS

United States Patent and Trademark Office, Non-Final Office Action issued to U.S. Appl. No. 16/189,092 dated Aug. 15, 2019, 31 pages.
(Continued)

*Primary Examiner* — Naomi J Small
(74) *Attorney, Agent, or Firm* — Hunton Andrews Kurth LLP (57) ABSTRACT

An animal rescue system identifies and rescues a protection target which is an animal, using information from a camera. The animal rescue system includes: a plurality of movable bodies each equipped with a camera; and a server configured to communicate with the plurality of movable bodies. The server is configured to identify a protection target, using information from the camera mounted on each of the plurality of movable bodies. The server is configured, when the protection target is identified, to (a) acquire positional information about each of the plurality of movable bodies and positional information about the protection target, and (b) select, as the protection target moves, a movable body which is to monitor the protection target, from the plurality of movable bodies.

7 Claims, 5 Drawing Sheets (51) Int. Cl.
*G06K 7/10* (2006.01)
*A01K 27/00* (2006.01)
*G08B 21/02* (2006.01)

(58) Field of Classification Search
USPC .................................................. 340/573.3
See application file for complete search history.

(56) References Cited

U.S. PATENT DOCUMENTS

| | | | |
|---|---|---|---|
| 9,804,596 B1* | 10/2017 | Slavin | .................... G06Q 50/10 |
| 9,826,415 B1 | 11/2017 | Byrne | |
| 2002/0156646 A1 | 10/2002 | Kaiwa et al. | |
| 2004/0233414 A1 | 11/2004 | Jamieson et al. | |
| 2006/0187027 A1 | 8/2006 | Smith | |
| 2007/0205937 A1 | 9/2007 | Thompson et al. | |
| 2010/0262367 A1 | 10/2010 | Riggins et al. | |
| 2013/0002869 A1 | 1/2013 | Yuasa et al. | |
| 2013/0178185 A1 | 7/2013 | Park et al. | |
| 2013/0194421 A1 | 8/2013 | Kita | |
| 2013/0217332 A1 | 8/2013 | Altman et al. | |
| 2014/0108377 A1* | 4/2014 | West | ........................ G06F 16/73 707/710 |
| 2014/0111332 A1 | 4/2014 | Przybylko et al. | |
| 2014/0133656 A1 | 5/2014 | Wurster et al. | |
| 2014/0167954 A1 | 6/2014 | Johnson et al. | |
| 2015/0194034 A1 | 7/2015 | Shim et al. | |
| 2016/0340006 A1 | 11/2016 | Tang | |
| 2017/0034682 A1 | 2/2017 | Matsumasa et al. | |
| 2017/0092109 A1 | 3/2017 | Trundle et al. | |
| 2017/0202180 A1* | 7/2017 | Yang | .................... G08B 29/188 |
| 2017/0301109 A1 | 10/2017 | Chan et al. | |
| 2017/0337791 A1* | 11/2017 | Gordon-Carroll | ...... H04L 67/12 |
| 2017/0364733 A1 | 12/2017 | Estrada et al. | |
| 2018/0039262 A1 | 2/2018 | Fox et al. | |
| 2018/0050800 A1* | 2/2018 | Boykin | ................ H04N 21/435 |
| 2018/0068546 A1 | 3/2018 | Fujimoto | |
| 2018/0082560 A1 | 3/2018 | Gillum et al. | |
| 2018/0096579 A1 | 4/2018 | Komatsu | |
| 2018/0128894 A1 | 5/2018 | Kaio | |
| 2018/0300964 A1 | 10/2018 | Lakshamanan et al. | |
| 2018/0357247 A1* | 12/2018 | Siminoff | .......... G08B 13/19608 |
| 2019/0057252 A1 | 2/2019 | Ichihara et al. | |
| 2019/0086914 A1 | 3/2019 | Yen et al. | |
| 2019/0147723 A1 | 5/2019 | Sawada et al. | |

FOREIGN PATENT DOCUMENTS

| | | |
|---|---|---|
| CN | 107230310 A | 10/2017 |
| CN | 207218924 U | 4/2018 |
| JP | H09-220266 A | 8/1997 |
| JP | 2005-092727 A | 4/2005 |
| JP | 2009064222 A | 3/2009 |
| JP | 2012-139182 A | 7/2012 |
| JP | 2013-157019 A | 8/2013 |
| JP | 2015-111906 A | 6/2015 |
| JP | 2016-218865 A | 12/2016 |
| KR | 20160026437 A | 3/2016 |
| WO | 2016132492 A1 | 8/2016 |
| WO | 2016162899 A1 | 10/2016 |
| WO | 2017154595 A1 | 9/2017 |

OTHER PUBLICATIONS

United States Patent and Trademark Office, Final Office Action issued to U.S. Appl. No. 16/189,092 dated Jun. 30, 2020, 49 pages.

* cited by examiner

ANIMAL RESCUE SYSTEM AND ANIMAL RESCUE METHOD, AND SERVER USED FOR ANIMAL RESCUE SYSTEM AND ANIMAL RESCUE METHOD

This nonprovisional application is based on Japanese Patent Application No. 2017-218374 filed on Nov. 13, 2017 with the Japan Patent Office, the entire contents of which are hereby incorporated by reference.

BACKGROUND

Field

The present disclosure relates to an animal rescue system and an animal rescue method as well as a server used for the animal rescue system and the animal rescue method, and more particularly relates to a system for detecting an animal to be protected (protection target), based on information from a camera mounted on a movable body.

Description of the Background Art

When a pet such as pet dog or pet cat gets lost, the pet owner has to search around for the lost pet. It is, however, considerably difficult for the pet owner to find the lost pet. Under the current circumstances, therefore, lost pets are less likely to return to their owners.

Japanese Patent Laying-Open No. 2012-139182 discloses a pet search system for searching for a lost pet by reading identification information stored in an RFID attached to the pet in advance. The identification information is read by a reader-writer mounted on a structure such as an automatic vending machine. Japanese Patent Laying-Open No. 2012-139182 also discloses that search for a pet is conducted using image data from a camera installed on a street or structure together with the information from an RFID.

Japanese Patent Laying-Open No. 2015-111906 discloses a search system for determining whether a person whose image is captured by a camera is a search target, based on images and/or video captured by a plurality of cameras connected to a network such as monitoring cameras installed on streets and moving cameras mounted on movable bodies like vehicles, and also based on text information derived from a name tag or the like shown on the images.

SUMMARY

The search system disclosed in Japanese Patent Laying-Open No. 2012-139182 requires that reader-writers be installed to be distributed across a large area for reading an RFID attached to a pet, which may increase the cost of establishing the system.

Regarding use of image data from cameras, the system disclosed in Japanese Patent Laying-Open No. 2012-139182 uses cameras' image data as complementary data, and a pet which is a search target is identified in image data through visual inspection by the pet owner. The search system disclosed in Japanese Patent Laying-Open No. 2015-111906 identifies the search target based on image information from cameras and text information acquired from the image information, and locates the search target based on positional information about the cameras transmitted together with the image information.

As for the stationary camera disclosed in Japanese Patent Laying-Open Nos. 2012-139182 and 2015-111906, however, a moving pet which is a search target may go out of the field of view of the stationary camera. As for a moving camera like car-mounted camera, the camera-mounted movable body itself moves, and therefore, even a stopping pet may go out of the field of view of the moving camera. Therefore, even when the pet (search target) is detected, the system may not be able to appropriately keep monitoring the pet to eventually lose sight of the pet.

The present disclosure is given to provide solutions to the above problems. An object of the present disclosure is to keep monitoring an identified animal to be protected (hereinafter referred to as "protection target"), by a system for identifying and rescuing the protection target, based on information from a camera mounted on a movable body.

An animal rescue system according to the present disclosure identifies and rescues a protection target which is an animal, using information from a camera. The animal rescue system includes: a plurality of movable bodies each equipped with a camera; and a server configured to communicate with the plurality of movable bodies. The server is configured to identify the protection target, using information from the camera mounted on each of the plurality of movable bodies. The server is configured, when the protection target is identified, to (a) acquire positional information about each of the plurality of movable bodies and positional information about the protection target, and (b) select, as the protection target moves, a movable body which is to monitor the protection target, from the plurality of movable bodies.

According to the present disclosure, regarding the system for identifying and rescuing a protection target such as pet based on information from the camera mounted on the movable body (vehicle for example), when the protection target is found and identified as a target to be protected and thereafter the protection target moves, the server selects a movable body to be used for monitoring the protection target, from the plurality of movable bodies. In this way, the system can keep monitoring the protection target identified as a target to be protected.

The plurality of movable bodies include a first movable body and a second movable body. The server is configured, while the first movable body is monitoring the protection target, to (a) predict a moving direction in which the protection target moves, from the positional information about the protection target, and (b) switch the movable body to be used for monitoring the protection target, from the first movable body to the second movable body, when the second movable body is located in the predicted moving direction.

In the system thus configured, a movable body located in the direction in which the protection target moves can appropriately take over monitoring. The system is thus prevented from losing sight of the protection target due to movement of the protection target.

The plurality of movable bodies include a first movable body and a second movable body. The first movable body and the second movable body are configured to communicate with each other. When the protection target goes out of a detectable range of the first movable body while the first movable body is monitoring the protection target, the first movable body requests the second movable body to take over monitoring of the protection target.

In the system thus configured, it is possible to take over monitoring through inter-mobile communication without the server. Accordingly, it is possible to more smoothly take over monitoring as compared with selection of a movable body through the server.

The plurality of movable bodies include a vehicle configured to perform automated driving. The vehicle is configured, when the vehicle detects the protection target, to track the protection target by automated driving, as the protection target moves.

In the system thus configured, when the movable body conducting search is a vehicle capable of automated driving, it is possible to track the protection target by this vehicle. When the vehicle used for monitoring is switched from one vehicle to another vehicle and respective fields of view of these two vehicles do not overlap each other, the system may lose sight of the protection target when the vehicle used for monitoring is switched from one vehicle to the other. In view of this, the vehicle which recognized the protection target tracks the target by automated driving, and thus the system can be prevented from losing sight of the protection target.

The vehicle is provided with an air vehicle equipped with a camera and capable of automated flight. When the protection target enters an area in which the vehicle is unable to track the protection target while the vehicle is tracking the protection target, the vehicle actuates the air vehicle and the air vehicle takes over monitoring of the protection target.

In the system thus configured, it is possible to keep monitoring the protection target, using an air vehicle like drone mounted on the vehicle. It is therefore possible to keep monitoring the protection target, even when the protection target is located in a place that the vehicle cannot enter.

Information about an owner of the protection target is registered in the server. The server is configured, when the protection target is identified, to give a notification to the owner.

In the system thus configured, a notification that a pet which is the protection target has been found can be given immediately to the pet owner.

A usual range of activities of the protection target is registered in the server. The server is configured, when a location where the protection target is found is out of the usual range of activities, to give a notification to the owner.

In the system thus configured, when a protection target is identified based on information from a camera mounted on a movable body and the detection position of the protection target is out of a predetermined range of activities (territory) defined in advance, a notification is given to the owner of the protection target. In other words, when the protection target is detected within a range of a territory of usual activities of the protection target, the notification is not given to the owner. Accordingly, excessive repetition of the notification to the owner can be suppressed.

The server is configured to request a rescue group to rescue the protection target, when the owner gives a request to protect the protection target in response to the notification to the owner.

In the system thus configured, the protection target can be protected by a person in charge in the rescue group, even when an owner for example of the protection target cannot immediately rush to the protection target.

The server is configured to learn the usual range of activities using positional information about the location where the protection target is found, when the owner does not give a request to protect the protection target in response to the notification to the owner.

The range of activities of the protection target is not necessarily constant, but may be changed. When the owner does not give a request to protect the protection target in response to the notification to the owner (when the owner determines that the protection target is not under an abnormal situation), there is a high possibility that the location where the protection target is found is within the usual range of activities of the protection target. Therefore, the location where the protection target is found in such a case can be learned to suppress unnecessary notification frequently given to the owner when the usual range of activities of the protection target is changed.

A server according to another aspect of the present disclosure is used for an animal rescue system for identifying a protection target which is an animal, using information from a camera mounted on each of a plurality of movable bodies. The server is configured to communicate with the plurality of movable bodies. The server is configured, when the protection target is identified, to (a) acquire positional information about each of the plurality of movable bodies and positional information about the protection target, and (b) select, as the protection target moves, a movable body which is to monitor the protection target, from the plurality of movable bodies.

A method according to still another aspect of the present disclosure is an animal rescue method for identifying and rescuing a protection target which is an animal by a system. The system includes: a plurality of movable bodies each equipped with a camera; and a server configured to communicate with the plurality of movable bodies. The animal rescue method includes: (a) identifying, by the server, the protection target using information acquired by the camera; (b) acquiring, by the server, positional information about each of the plurality of movable bodies and positional information about the protection target, when the protection target is identified; and (c) selecting, by the server, a movable body which is to monitor the protection target, from the plurality of movable bodies, as the protection target moves.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments of the present disclosure are described in detail with reference to the drawings. In the drawings, the same or corresponding elements are denoted by the same reference characters, and a description thereof is not repeated.

<System Overview>

Figure 1:
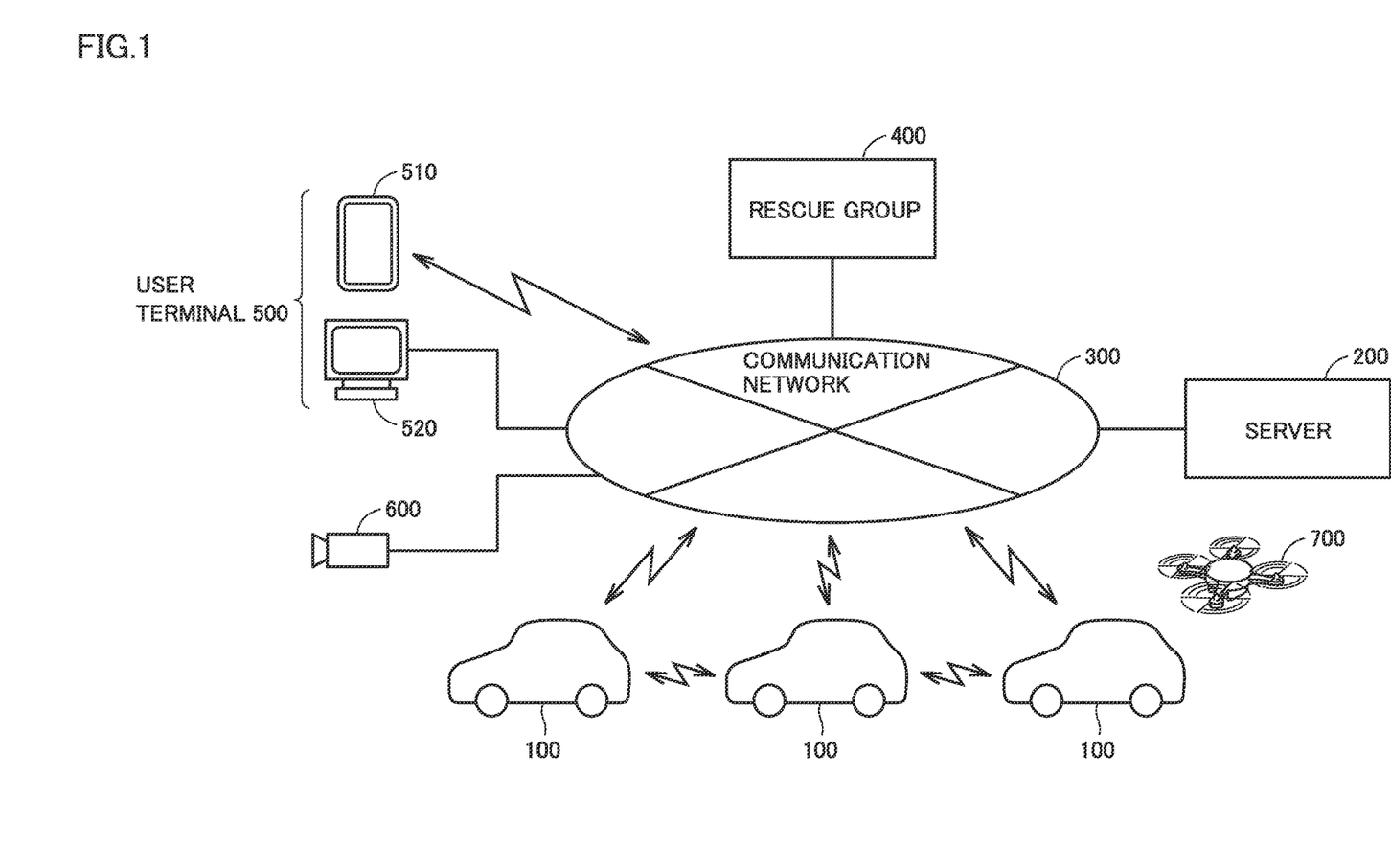
FIG. 1 is a schematic diagram of an overall configuration of a rescue system according to the present embodiment.

FIG. 1 is a schematic diagram of an overall configuration of an animal rescue system (also referred to simply as "rescue system" hereinafter) 10 according to the present embodiment. Referring to FIG. 1, rescue system 10 includes a plurality of movable bodies 100 and a server 200 configured to communicate with movable bodies 100. Rescue system 10 searches for a pet as a protection target which is an animal, based on information acquired from movable bodies 100.

Regarding the present embodiment, an example is described in which a vehicle is used as movable body 100, and movable body 100 is also referred to simply as "vehicle 100" hereinafter. Vehicle 100 includes automobile, motorcycle, bicycle, and the like. In the following description, the protection target is illustrated as a pet kept at home for example. Animal rescue system 10 according to the present embodiment, however, is also applicable to animals other than pets.

Vehicle 100 and server 200 are configured to transmit/receive information to/from each other through a communication network 300 such as the Internet or telephone line, for example. Vehicle 100 and server 200 may directly communicate with each other without communication network 300. Vehicles 100 are also capable of directly communicating with each other.

The pet owner who is a user registers, in server 200 in advance, information on the protection target pet, by manipulating a user terminal 500 such as a mobile terminal 510 like smart phone or a personal computer 520 at the owner's home. Server 200 acquires information from cameras and/or a variety of sensors mounted on vehicles 100 located in a predetermined area, or a stationary camera 600 installed on a street or shop, and identifies the pet using the acquired information and the registered information.

The search by vehicle 100 is conducted, when the pet gets lost for example, at the request of the owner. Vehicle 100 may patrol based on a command from server 200, even when no request to search for the pet is given from the owner.

Some of vehicles 100 are each equipped with an air vehicle 700 capable of automated flight like drone. Air vehicle 700 is equipped with a camera (not shown) and has a function of automatically tracking a specified target based on images captured by the camera. Air vehicle 700 is also configured to transmit the images captured by the camera to server 200 via vehicle 100.

When the protection target pet is identified, server 200 notifies the owner of information on the detected pet through user terminal 500. At the request of the owner or based on determination by server 200 itself, server 200 requests a rescue group 400 to protect the identified pet. Rescue group 400 includes, for example, a public office such as city office or municipal office, a police, a fire station, a security company, an animal hospital, an NPO (Non-Profitable Organization), and the like. Alternatively, rescue group 400 may be a vehicle or a shop located around the location where the protection target pet is detected. Rescue group 400 receiving the request temporarily accepts the protection target pet until the arrival of the owner, or sends the pet to the owner's home.

<Configuration of Vehicle and Server>

Figure 2:
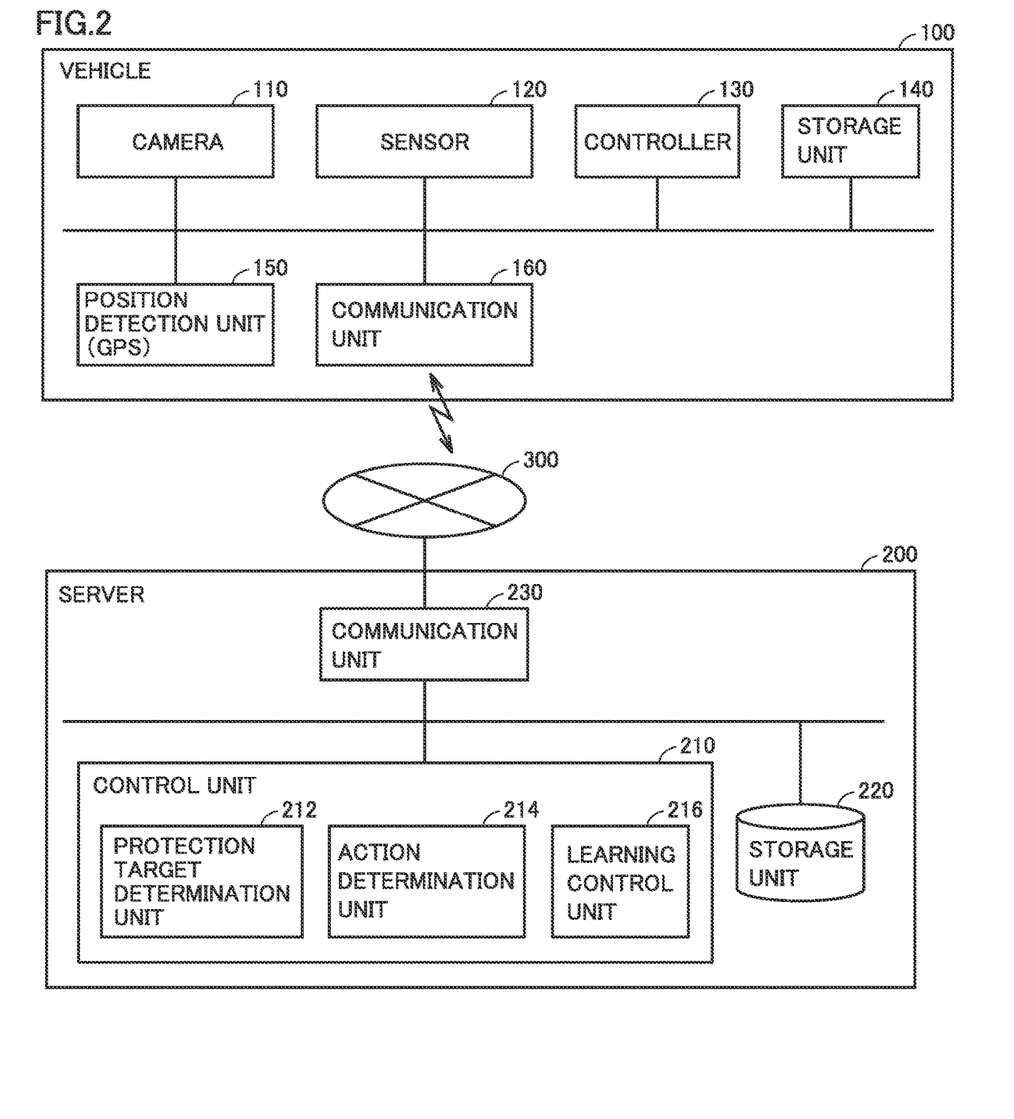
FIG. 2 is a block diagram for illustrating details of a vehicle and a server in FIG. 1.

FIG. 2 is a block diagram for illustrating details of vehicle 100 and server 200 in FIG. 1. Referring to FIG. 2, vehicle 100 includes a camera 110, a sensor 120, a controller 130, a storage unit 140, a position detection unit 150, and a communication unit 160.

Communication unit 160 is a communication interface between vehicle 100 and communication network 300. Vehicle 100 transmits/receives information to/from server 200 through communication unit 160. Vehicle 100 is also capable of performing inter-vehicle communication with other vehicles through communication unit 160. Further, when vehicle 100 is equipped with air vehicle 700, communication unit 160 may also be used to communicate with this air vehicle 700.

Camera 110 is a CCD (Charge Coupled Device) camera, for example, and attached to a position from which an image of a region in front of and/or a region behind vehicle 100 can be captured. Camera 110 is mounted as a part of a drive recorder for recording images when vehicle 100 suffers an accident or the like, for example. The images captured by camera 110 are transmitted to server 200 through communication unit 160. The images are captured by camera 110 not only during running of vehicle 100 but also during parking of vehicle 100 at a parking area or the like.

Sensor 120 is a receiver for wirelessly detecting information stored on an ID tag or the like, or a reader for reading information from a barcode or QR Code® (two-dimensional barcode), for example. The information acquired by sensor 120 is transmitted to server 200 through communication unit 160 and used for identifying a pet as a protection target.

Position detection unit 150 is mounted for example on a navigation device (not shown) to acquire information about the absolute position of the vehicle on which this position detection unit 150 is mounted, by means of the GPS (Global Positioning System). Position detection unit 150 outputs the acquired positional information to server 200.

Controller 130 includes a CPU (Central Processing Unit), a storage such as memory, and an input/output buffer (they are not shown), to perform overall control of vehicle 100. Receiving from server 200 a command to search for a pet as a protection target, controller 130 acquires information from a detection device (camera 110 and/or sensor 120) and transmits the acquired information to server 200. When vehicle 100 is to identify the pet, controller 130 stores in storage unit 140 information regarding the pet (protection target) which is transmitted from server 200, and compares the information acquired from the detection device with the information stored in storage unit 140 to identify the pet as a protection target.

Server 200 includes a control unit 210, a storage unit 220, and a communication unit 230. Control unit 210 includes a protection target determination unit 212, an action determination unit 214, and a learning control unit 216.

Communication unit 230 is a communication interface between server 200 and communication network 300. Server 200 transmits/receives information to/from vehicle 100 and rescue group 400 for example through communication unit 230.

Storage unit 220 stores in advance information about characteristics of a pet (protection target) for identifying the pet. The characteristics used for identifying the pet include the species, the size, the pattern, and the color of the pet, image information such as a photograph of the face of the pet, information about characteristic behavioral patterns of the pet, and information about a usual range of activities (territory) of the pet, for example. When a beacon such as RFID is installed on a collar or in the body of the pet, information stored in the RFID is also stored in storage unit 220.

Protection target determination unit 212 included in control unit 210 receives image information acquired by camera 110 of vehicle 100 and/or information acquired by sensor 120. Protection target determination unit 212 analyzes the image information from camera 110 to detect characteristics of the face and the color for example of an animal included in the image. Protection target determination unit 212 compares these pieces of information with the information stored in storage unit 220 to determine whether the animal of which image is captured is the protection target pet. Protection target determination unit 212 may also compare the ID information extracted by sensor 120 with the information stored in storage unit 220 to identify the protection target pet. It may also extract, from the image (video image) from camera 110, behavioral patterns of the animal by big data analysis, so as to identify the protection target.

Action determination unit 214 determines what action is to be taken, when protection target determination unit 212 identifies the protection target pet. Specifically, action determination unit 214 determines whether to inform the pet owner of the fact that the protection target pet has been found, and determines whether to make a rescue request to a rescue group, in accordance with standards stored in storage unit 220.

Leaning control unit 216 learns information about the registered usual range of activities (territory) of the pet and updates the information.

When a heretofore proposed pet search system uses a stationary camera and a pet as a search target is moving, the pet may go out of the field of view of the camera. When a moving camera such as vehicle-mounted camera is used and the movable body on which the camera is mounted itself is moving, the pet may also go out of the field of view of the camera even if the pet is stationary. Accordingly, even when the pet as a search target is found, the system may not be able to appropriately keep monitoring the pet and eventually lose sight of the pet.

In view of the above, the present embodiment employs the following scheme. Specifically, when the pet as a protection target is identified, a vehicle which is to monitor the pet is selected appropriately as the pet moves, based on the positional information about the pet and the positional information about vehicles located around the pet. Even when the found pet as a protection target moves to go out of the field of view of the camera of a certain vehicle, the system configured in this way can appropriately designate another vehicle to take over monitoring of the pet.

<Description of Control Details>

Figure 3:
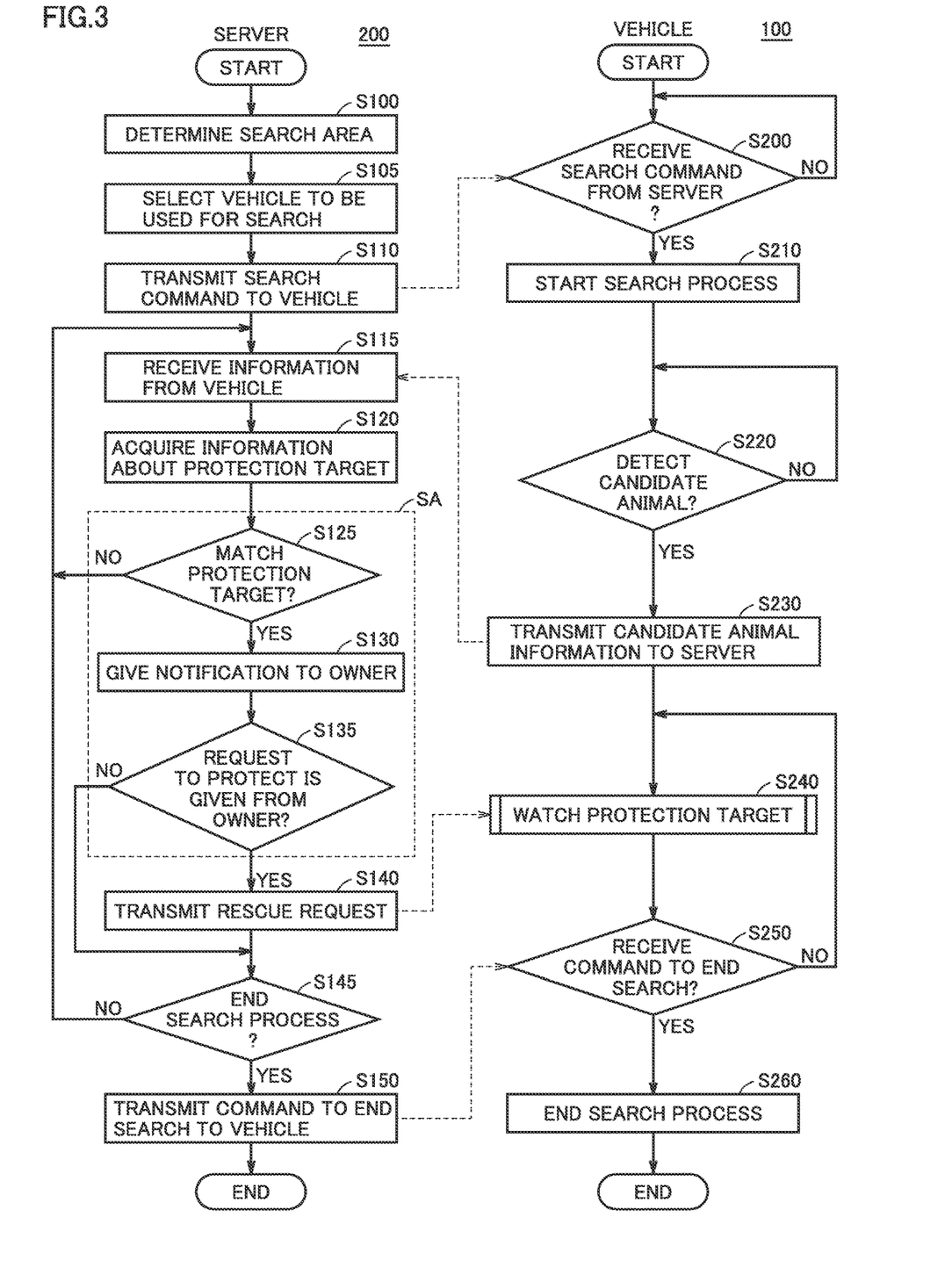
FIG. 3 is a flowchart for illustrating details of control executed by a vehicle and a server for a rescue system according to an embodiment.

FIG. 3 is a flowchart for illustrating details of control executed by vehicle 100 and server 200 in rescue system 10 according to the present embodiment. The flowchart shown in FIG. 3 is executed by calling a program stored in controller 130 of vehicle 100 and control unit 210 of server 200 from a main routine in a predetermined cycle or when a predetermined condition is met. Alternatively, a part or all of the steps in the flowchart may be performed by dedicated hardware (electronic circuit).

Referring to FIG. 3, a process performed by server 200 is described first. Server 200 defines, in step (hereinafter step is abbreviated as S) 100, a search area to be searched for a pet as a protection target. The search area is preferably defined based on the usual range of activities of the pet. The search area may be defined based on the address of the pet owner, such as an area of 20 km from the pet owner's home, for example, in response to the request for search given from the pet owner, or the search area may be within a range designated by the pet owner. When no request for search is given from a pet owner, a predetermined patrol range is defined as a search area.

In S105, server 200 acquires positional information about a plurality of vehicles through communication network 300. From among vehicles located within the defined search area, at least one vehicle is selected to be used for the search for the pet as a protection target. In S110, server 200 outputs a search command to selected vehicle 100 to search for the pet. Although not shown in the flowchart, if the selected vehicle moves to go out of the search area or a new vehicle enters the search area, the vehicle to be used for search may be changed as appropriate. Alternatively, no specific vehicle may be selected and the search command may be broadcasted to vehicles located in the defined search area.

When server 200 acquires, from selected vehicle 100 to which the search command is output, information about an animal which is a candidate of the search target pet (S115), server 200 acquires the information about the search target pet registered in storage unit 220 (S120), and analyzes image data included in the received information to extract characteristics of the animal. Based on the extracted information about characteristics of the animal and the information from storage unit 220, server 200 determines whether the candidate matches the pet requested to be searched for by the pet owner or, during patrol, determines whether the candidate animal is included in a list of protection targets registered in storage unit 220 (S125).

When the candidate animal is not the protection target pet (NO in S125), the process returns to S115 in which server 200 further acquires information from the aforementioned or another vehicle 100 and further compares the acquired information with the information about the protection target pet (S120).

When the candidate animal is the protection target pet (YES in S125), server 200 informs, in step S130, the pet owner of the fact that the pet has been found.

After the notification that the pet has been found is given to the pet owner, the process proceeds to S135 in which server 200 determines whether a request to protect the found pet has been given from the pet owner receiving the notification. When the request to protect has been received from the pet owner (YES in S135), the process proceeds to S140 in which server 200 transmits a command to protect (request for rescue) to rescue group 400 such as a security company or a police office near the location where the pet was found. Receiving the request for rescue, the rescue group dispatches a person in charge to the location indicated by the positional information about the pet transmitted from server 200. In this way, even under situations where the pet owner cannot immediately rush to the location where the pet was found, the request to rescue the found pet may be given to the rescue group to properly protect the pet as a protection target.

In S140, server 200 transmits, to each vehicle 100 conducting the search, positional information about the position where the protection target pet was found and the latest information about characteristics of the pet, for example. In response, each vehicle 100 watches the found pet (S240).

When the owner of the protection target pet determines that it is unnecessary to protect the pet, based on the information transmitted from server 200 (NO in S135), S170 is skipped and the process proceeds to S145. In S145, server 200 determines whether the pet owner or an administrator of server 200 has instructed server 200 to end the search process. When the instruction to end the search process has not been given (NO in S145), the process proceeds to S115 in which server 200 keeps searching for and watching the protection target pet. When the instruction to end the search process is given (YES in S145), the process proceeds to S150 in which server 200 transmits to each vehicle a command to end the search. The command to end the search in S150 may be issued based on information indicating that protection of the protection target pet is completed which is given from rescue group 400.

Next, a process performed by vehicle 100 is described. While FIG. 3 shows the process performed by a single vehicle 100, the following process is performed by each of selected vehicles when server 200 selects these vehicles as vehicles which are to conduct the search.

In S200, vehicle 100 determines whether the vehicle has received from server 200 a command to search for a protection target pet, i.e., whether the vehicle itself has been selected as a vehicle for searching for the pet. When the vehicle has not received from server 200 the command to search (NO in S200), the process returns to S200 and the search process is kept on standby until the command to search is given from server 200.

When the vehicle has received the command to search (YES in S200), the process proceeds to S210 in which vehicle 100 starts the search process. As described above with reference to FIG. 2, vehicle 100 determines, based on the information acquired by camera 110 and/or sensor 120, whether an animal as a candidate of the protection target has been detected (S220). According to the present embodiment, server 200 identifies the protection target pet, and therefore, vehicle 100 determines the candidate based on general characteristics such as the size and the color of the detected animal, for example.

When no candidate animal is detected (NO in S220), the process returns to S220 and vehicle 100 continues the search for a candidate animal. When the candidate animal is detected (YES in S220), the process proceeds to S230 in which vehicle 100 transmits to server 200 information acquired by camera 110 and/or sensor 120.

Receiving the notification that server 200 has identified the protection target pet based on the information from vehicle 100, vehicle 100 acquires from server 200, in S240, information about the location where the pet was detected and information about characteristics of the pet at the time when the pet was detected, for example, and watches the protection target pet based on the acquired information. Watching of the protection target pet is, for example, tracking of the identified pet by this vehicle or other vehicles around the former vehicle. Thus, the identified pet is kept being watched and accordingly the system can be prevented from losing sight of the detected pet.

Figure 4:
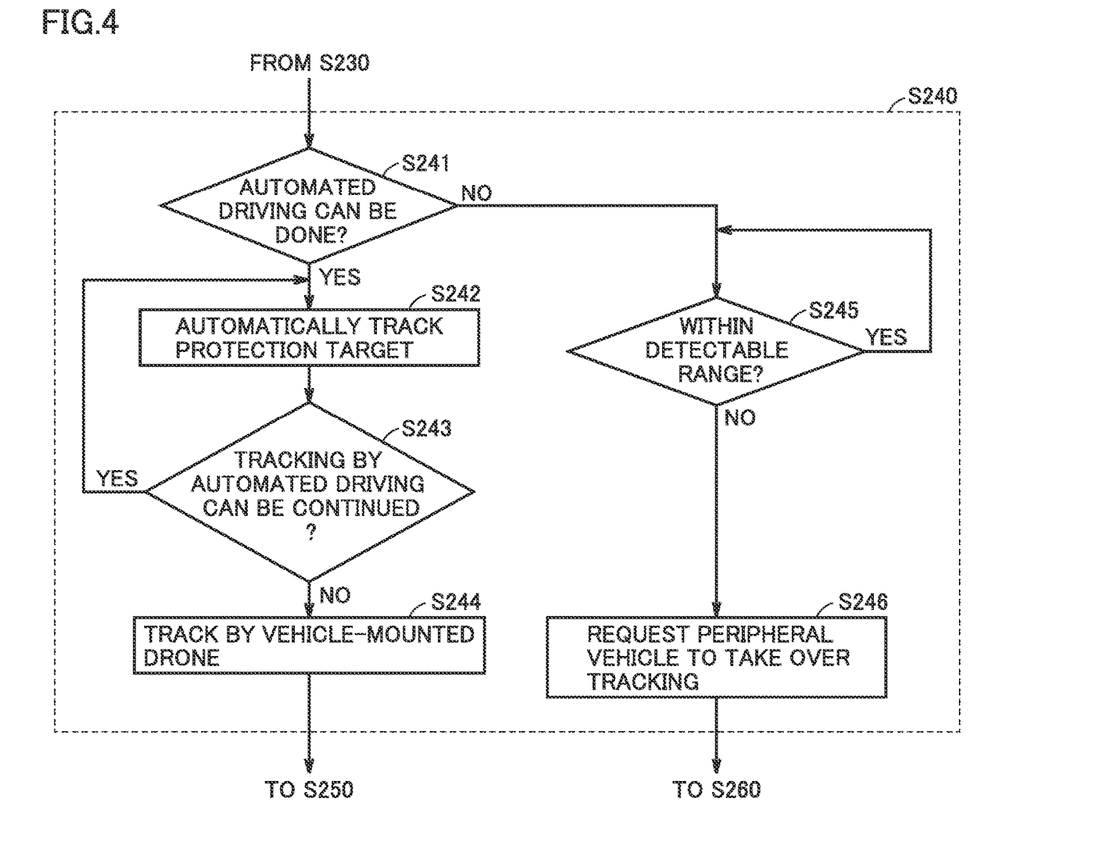
FIG. 4 is a diagram showing details of an operation performed in step S240 in FIG. 3.

FIG. 4 is a flowchart for illustrating details of the operation in step S240 of FIG. 3 for watching the protection target pet. Referring to FIG. 4, when vehicle 100 receives from server 200 the notification that the protection target pet has been identified (S140 in FIG. 3), vehicle 100 determines in S241 whether the vehicle itself has an automated driving function and whether the automated driving function can be performed at present. Such a vehicle is typically a rental car or sharing car having an automated deadheading function, for example. Such a vehicle may also be a privately owned vehicle allowed to be rented to the public while not in use by the owner.

When the vehicle can perform the automated driving function (YES in S241), the process proceeds to S242 in which vehicle 100 tracks the identified pet while performing the automated driving function. In S243, vehicle 100 determines whether the vehicle can keep tracking the pet by the automated driving. For example, vehicle 100 determines that it cannot keep tracking the pet, when the pet moves to enter a site (e.g. park, the premises of a private home, or one-way road) that vehicle 100 cannot enter, or when vehicle 100 cannot proceed due to a traffic jam or an obstacle, or when vehicle 100 is to be used by the owner, for example. When the vehicle can keep tracking the pet (YES in S243), the process proceeds to S242 and the vehicle keeps tracking the pet while performing the automated driving function.

When the vehicle cannot keep tracking the pet (NO in S243), the process proceeds to S244. When the vehicle is equipped with air vehicle 700 like drone, air vehicle 700 is flown to continue the tracking of the pet. When vehicle 100 is not equipped with air vehicle 700 or vehicle 100 is to be used by the user, for example, step S244 may be skipped. Then, the process proceeds to S250.

When vehicle 100 cannot perform the automated driving function (NO in S241), the process proceeds to S245 in which it is determined whether the protection target pet is detected within a detectable range of camera 110 of vehicle 100 at the current position. When the pet is within the detectable range of camera 110 (YES in S245), the process returns to S245 and vehicle 100 keeps monitoring the pet.

When the pet goes out of the detectable range of camera 110 (NO in S245), the process proceeds to S246 in which vehicle 100 uses inter-vehicle communication to transmit, to a peripheral vehicle, a request to take over tracking of the pet. As to the determination in S245, not only when the pet has gone completely out of the field of view of camera 110 but also when the pet which is detected at an outer edge of the field of view is nearly going out of the field of view, it may be determined that the pet is out of the detectable range. After the operation in S246 is performed, the process proceeds to S260 (FIG. 3).

In S246, inter-vehicle communication is used to request a vehicle to take over monitoring of the pet. The vehicle which is to take over monitoring may be selected by server 200 based on the positional information about the pet and the positional information about vehicle 100 as described above. Server 200 acquires the positional information about peripheral vehicles as appropriate. Therefore, server 200 may predict, from the positional information, the direction in which the pet moves, and select another vehicle located in the predicted direction of movement to instruct the selected vehicle to take over tracking of the pet, for example.

Referring again to FIG. 3, vehicle 100 determines, in S250, whether server 200 has transmitted a command to end the search for the protection target pet. When vehicle 100 has not received the command to end the search (NO in S250), the process returns to S240 in which the watching of the protection target pet is continued. When vehicle 100 has received the command to end the search (YES in S250), the process proceeds to S260 and vehicle 100 accordingly ends the search process.

Although not shown in FIG. 3, when server 200 could not identify the protection target pet, the process returns to S220 and vehicle 100 continues the search for another candidate. When the protection target pet goes out of the field of view of camera 110 for example while the protection target pet is watched in S240, the process also returns to S220 and the search for the protection target is performed again.

Under control performed in accordance with the process as described above, the rescue system of the present embodiment can identify the protection target pet, based on information acquired by the camera mounted on a selected vehicle. When the pet is identified and the selected vehicle can perform automated driving, the vehicle having detected the pet keeps monitoring the pet. When the pet moves and accordingly the originally selected vehicle can no more keep monitoring the pet, the vehicle performing the monitoring is changed appropriately. In this way, the system can keep monitoring the identified pet, without losing sight of the pet.

First Modification

According to the above description of the embodiment, when a protection target pet is found, the notification that the pet has been found is always given to the pet owner.

If the pet is a cat for example, however, the pet may freely go out for strolling. If the notification is given to the pet owner in such a case as well, the unnecessary notification may be given frequently.

In view of the above, according to a modification, when a protection target pet is detected but the pet is detected within the ordinary range of activities (territory) of the pet, the notification is not given to the pet owner. Only when the pet goes out of this range of activities, the notification is given to the pet owner. In this way, unnecessary notification to the pet owner can be suppressed.

This territory is not necessarily constant. The range of activities may be gradually expanded or changed. Therefore, according to this modification, when a notification that a pet has gone out of a given range of activities is provided to the pet owner but the pet owner does not make a request to protect the pet, the location where the pet is detected at this time is learned as a range of the territory. In this way, the notification is given to the pet owner in consideration of change of the range of activities of the pet, and therefore, unnecessary notification to the pet owner can further be suppressed.

Figure 5:
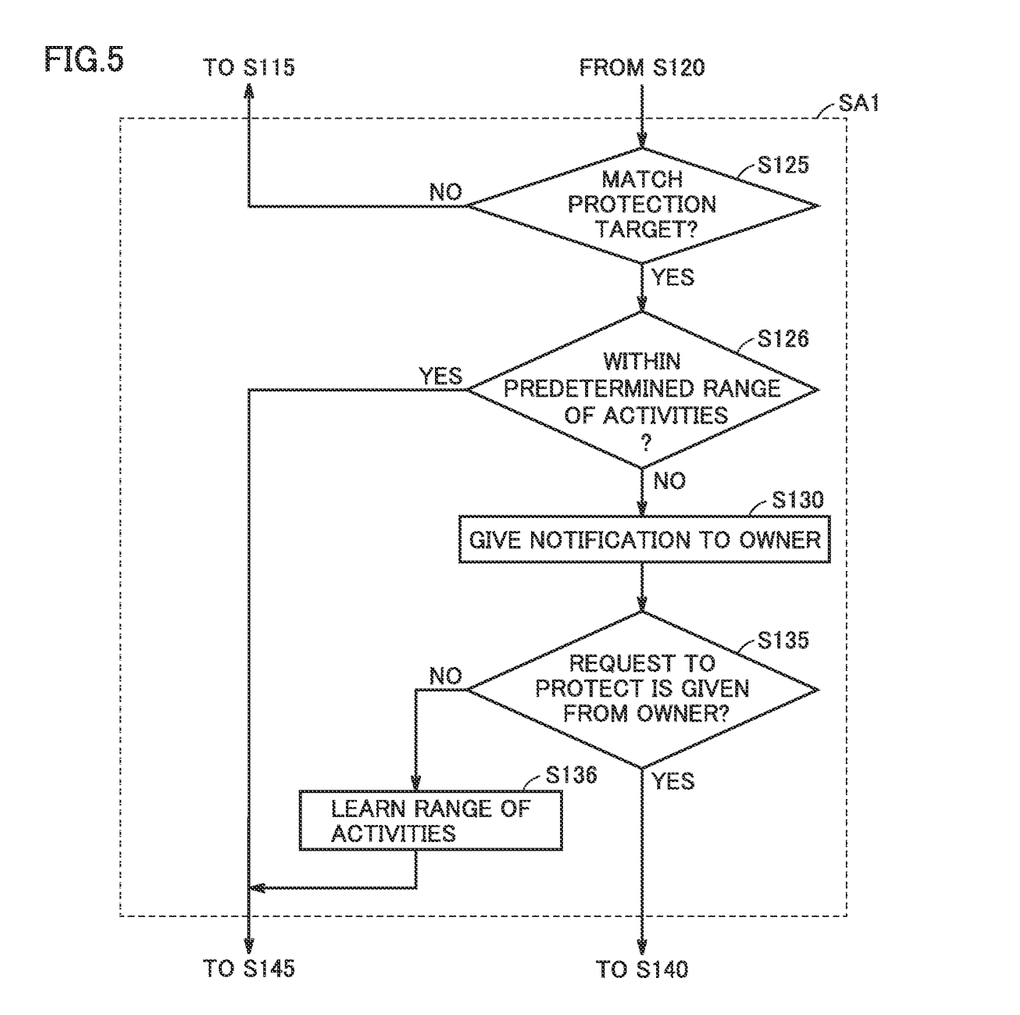
FIG. 5 is a flowchart for illustrating activity-range learning control executed by a server according to a modification.

FIG. 5 is a flowchart for illustrating control of learning of the range of activities performed by server 200. FIG. 5 shows a process (SA1) corresponding to the operations in steps S125 to S135 in FIG. 3 (SA in FIG. 3). This SA1 includes S126 and S136 in addition to S125, S130, and S135 in FIG. 3. Regarding FIG. 5, the description of steps common to FIG. 5 and FIG. 3 is not repeated.

Referring to FIGS. 3 and 5, when the protection target pet is identified in S125 (YES in S125), the process proceeds to S126 in which server 200 determines whether the location where the pet was found is within the usual range of activities (territory) of the pet. When the location where the pet was found is within the range of the territory of the pet (YES in S126), server 200 does not give notification to the pet owner and proceeds to S145.

When the location where the pet was found is out of the range of the territory (NO in S126), the process proceeds to S130 in which server 200 gives notification to the pet owner. After this, when the pet owner makes a request to protect in response to the notification (YES in S135), the process proceeds to S140 in which a request for rescue is given to rescue group 400.

When no request to protect is given from the pet owner (NO in S135), server 200 determines that the location where the pet was found this time is within the range of the territory, learns this range of activities of the pet (S136), and thereafter proceeds to S145.

Under control performed in accordance with the process as described above, when a protection target pet is found but the location where the pet is found is within the usual range of activities of the pet, notification is not given to the pet owner. Only when the location where the pet is found is out of the range of activities, notification is given to the pet owner. In this way, unnecessary notification to the pet owner can be suppressed.

When the location where the pet is found is out of the range of activities but the pet owner does not give a request to protect the pet, it is determined that the territory of the protection target pet has been expanded and the location where the pet is found is learned as being located within the usual range of activities. Thus, even when the range of activities of the protection target pet is changed, whether to give notification or not can be determined appropriately, and therefore, unnecessary notification to the pet owner can further be suppressed.

Second Modification

According to the above description, a vehicle is used as movable body 100. Movable body 100, however, may represent a concept including human. For example, as the camera mounted on the movable body in the above description, a mobile terminal (smart phone or the like) having the photography function or a wearable camera which is wearable on a human body may also be used. If the movable body is a human, the movable body is not limited to those who are experts in search, but images taken by an ordinary person who is taking a stroll, jogging, or walking may be transmitted to server 200.

Moreover, an animal having undergone a special training may also be used as movable body 100. Particularly when the search target is an animal as in the present embodiment, the search may also be conducted by an animal, so that a location where a human or vehicle cannot enter can also be searched.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An animal rescue system for identifying and rescuing a protection target which is an animal, using information from a camera, the animal rescue system comprising:
   a plurality of movable bodies each equipped with a first camera; and
   a server configured to communicate with the plurality of movable bodies,
   the server being configured to identify the protection target, using information from the first camera mounted on each of the plurality of movable bodies,
   the server being configured, when the protection target is identified, to
      acquire positional information about each of the plurality of movable bodies and positional information about the protection target, and
      select, as the protection target moves, a movable body which is to monitor the protection target, from the plurality of movable bodies,
   the plurality of movable bodies including a vehicle configured to perform automated driving,
   the vehicle being provided with an air vehicle equipped with a second camera and capable of automated flight,
   when the vehicle detects the protection target, the vehicle being configured to track the protection target by automated driving, as the protection target moves,
   the vehicle being configured to determine whether or not the vehicle is able to continue to track the protection target by the automated driving during tracking the protection target,
   when the vehicle determines that the vehicle is unable to continue to track the protection target, the vehicle being configured to actuate the air vehicle and the air vehicle being configured to take over monitoring of the protection target, wherein
   information about an owner and a usual range of activities of the protection target are registered in the server,
   when the protection target is identified and when a location where the protection target is found is out of the usual range of activities, the server is configured to give a notification to the owner, and
   the server is configured to learn the usual range of activities using positional information about the location where the protection target is found, when the owner does not give a request to protect the protection target in response to the notification to the owner.

2. The animal rescue system according to claim 1, wherein
the plurality of movable bodies include a first movable body and a second movable body, and
the server is configured, while the first movable body is monitoring the protection target, to
predict a moving direction in which the protection target moves, from the positional information about the protection target, and
switch the movable body to be used for monitoring the protection target, from the first movable body to the second movable body, when the second movable body is located in the predicted moving direction.

3. The animal rescue system according to claim 1, wherein
the plurality of movable bodies include a first movable body and a second movable body,
the first movable body and the second movable body are configured to communicate with each other, and
when the protection target goes out of a detectable range of the first movable body while the first movable body is monitoring the protection target, the first movable body requests the second movable body to take over monitoring of the protection target.

4. The animal rescue system according to claim 1, wherein
when the vehicle is to be used by a user while the vehicle is tracking the protection target, the vehicle determines that the vehicle is unable to continue to track the protection target.

5. The animal rescue system according to claim 1, wherein
the server is configured to request a rescue group to rescue the protection target, when the owner gives a request to protect the protection target in response to the notification to the owner.

6. An animal rescue method for identifying and rescuing a protection target which is an animal by a system, the system comprising:
a plurality of movable bodies each equipped with a first camera; and
a server configured to communicate with the plurality of movable bodies,
the animal rescue method comprising:
identifying, by the server, the protection target using information acquired by the first camera;
acquiring, by the server, positional information about each of the plurality of movable bodies and positional information about the protection target, when the protection target is identified; and
selecting, by the server, a movable body which is to monitor the protection target, from the plurality of movable bodies, as the protection target moves;
obtaining and storing, by the server, information about an owner and a usual range of activities of the protection target;
giving, by the server, a notification to the owner when the protection target is identified and when a location where the protection target is found is out of the usual range of activities; and
learning, by the server the usual range of activities using positional information about the location where the protection target is found, when the owner does not give a request to protect the protection target in response to the notification to the owner,
the plurality of movable bodies including a vehicle configured to perform automated driving
the vehicle being provided with an air vehicle equipped with a second camera and capable of automated flight,
the animal rescue method further comprising:
when the vehicle detects the protection target, tracking, by the vehicle, the protection target by automated driving, as the protection target moves;
determining, by the vehicle, whether or not the vehicle is able to continue to track the protection target by the automated driving during tracking the protection target; and
when the vehicle determines that the vehicle is unable to continue to track the protection target, actuating the air vehicle by the vehicle, and taking over monitoring of the protection target by the air vehicle.

7. An animal rescue system for identifying and rescuing a protection target which is an animal, using information from a camera, the animal rescue system comprising:
a plurality of movable bodies each equipped with a first camera; and
a server configured to communicate with the plurality of movable bodies,
the server being configured to identify the protection target, using information from the first camera mounted on each of the plurality of movable bodies,
the server being configured, when the protection target is identified, to
acquire positional information about each of the plurality of movable bodies and positional information about the protection target, and
select, as the protection target moves, a movable body which is to monitor the protection target, from the plurality of movable bodies,
the plurality of movable bodies including a vehicle configured to perform automated driving,
the vehicle being provided with an air vehicle equipped with a second camera and capable of automated flight,
when the vehicle detects the protection target, the vehicle being configured to track the protection target by automated driving, as the protection target moves,
the vehicle being configured to determine whether or not the vehicle is able to continue to track the protection target by the automated driving during tracking the protection target,
when the vehicle determines that the vehicle is unable to continue to track the protection target, the vehicle being configured to actuate the air vehicle and the air vehicle being configured to take over monitoring of the protection target,
wherein the vehicle determines that the vehicle is unable to continue to track the protection target when the protection target enters an area in which the vehicle is unable to track the protection target while the vehicle is tracking the protection target, when the vehicle is unable to drive due to traffic jam or an obstacle, or when the vehicle is to be used by a user.

* * * * *